United States Patent
Ito

Patent Number: 5,850,577
Date of Patent: Dec. 15, 1998

[54] MACRO-PHOTOGRAPHING SYSTEM IN ZOOM LENS CAMERA

[75] Inventor: Takayuki Ito, Tokyo, Japan

[73] Assignee: Asahi Kogaku Kogyo Kabushiki Kaisha, Tokyo, Japan

[21] Appl. No.: 831,755

[22] Filed: Apr. 1, 1997

[30] Foreign Application Priority Data

Apr. 1, 1996 [JP] Japan .................................. 8-079244

[51] Int. Cl.$^6$ .................................................. G03B 17/00
[52] U.S. Cl. ............................... 396/80; 396/85; 359/705
[58] Field of Search ................................. 396/76, 79–83, 396/85–87, 72; 359/705

[56] References Cited

U.S. PATENT DOCUMENTS

| | | | |
|---|---|---|---|
| 4,885,600 | 12/1989 | Iwasa et al. ............................. | 396/81 |
| 5,136,320 | 8/1992 | Kobayashi et al. . | |
| 5,150,145 | 9/1992 | Haraguchi et al. . | |
| 5,189,559 | 2/1993 | Kaneko . | |
| 5,223,873 | 6/1993 | Tsuboi . | |
| 5,266,992 | 11/1993 | Takaoka et al. . | |

FOREIGN PATENT DOCUMENTS

| | | |
|---|---|---|
| 63-303327 | 12/1988 | Japan . |
| 3200907 | 9/1991 | Japan . |
| 7159667 | 6/1995 | Japan . |

*Primary Examiner*—W. B. Perkey
*Attorney, Agent, or Firm*—Greenblum & Bernstein, P.L.C.

[57] ABSTRACT

A macro-photographing system in a zoom lens camera includes a lens system having at least a movable front lens group on the object side and a movable rear lens group on the image surface side, a whole-unit driving device which moves the front lens group and the rear lens group together, a relative drive device which relatively moves the front lens group or the rear lens group to vary the distance between the front and rear lens groups, a zoom operation device which sets the focal length by the lens system, and a macro-photographing setting device which sets at least one close object distance. The camera position is fixed when the camera is focused on the object at the close object distance set by the macro-photographing setting device. When the zoom operation means is actuated, at least one of the whole-unit driving device and the relative drive device are actuated to keep the focused state for the close object distance.

18 Claims, 9 Drawing Sheets

MACRO-PHOTOGRAPHING SYSTEM IN ZOOM LENS CAMERA

BACKGROUND OF THE INVENTION

1. Field of the Invention

The present invention relates to a macro-photographing system in a zoom lens camera such as a compact camera in which a zoom lens is provided integrally with a camera body.

2. Description of the Related Art

There are known different types of macro-photographing systems for a zoom lens camera, such as a whole-range macro photographing system or a tele-macro photographing system, etc. In the whole-range macro-photographing system, the shortest object distance (which may be focused) is merely reduced regardless of the focal length and the system has no special construction therefor.

In the tele-macro photographing system, a specific lens is moved (advanced) to make the shortest object distance (at which the system may be focused) smaller at the longest focal length (telephoto extremity) than the shortest object distance at other focal lengths.

In theory, a wide-macro photographing system can be provided, in which a specific lens is moved (advanced) to make the shortest object distance smaller at the shortest focal length (wide-angle extremity) than the shortest object distance at other focal lengths. Nevertheless, no wide-macro photographing system has been employed, because the macro-photographing is, in principle, aimed at an increase of the magnification.

Moreover, in theory, it is possible to provide a macro-photographing system in which the macro-photographing can be effected only at an intermediate focal length.

In any event, in conventional macro-photographing systems, the macro-photographing can be achieved only at a specific focal length. It is therefore impossible to carry out the zooming operation in the macro-photographing mode when the lens system is focused on a close object.

SUMMARY OF THE INVENTION

It is an object of the present invention to provide a new macro-photographing system for a zoom lens camera, in which the zooming operation (to vary the magnification) can be effected at a predetermined close object distance.

To achieve the object of the present invention mentioned above, according to the present invention, there is provided a macro-photographing system in a zoom lens camera, comprising;

a lens system having at least a movable front lens group on the object side and a movable rear lens group on the image surface side;

a whole-unit driving means for moving the front lens group and the rear lens group together;

a relative drive means for relatively moving the front lens group or the rear lens group to vary the distance between the front and rear lens groups;

a zoom operation means for setting the focal length by the lens system; and, a macro-photographing setting means for setting at least one close object distance;

wherein the camera position is fixed when the camera is focused on the object at the close object distance set by the macro-photographing setting means, and when the zoom operation means is actuated, at least one of the whole-unit driving means and the relative drive means are actuated to keep the focused state for the close object distance.

With this arrangement, the macro-photographing operation can be carried out using the two drive means for the zooming and/or focusing operation without increasing the movement of the lens groups.

There are five modes to maintain the focused state for the close object (distance) when the zoom operation means is actuated;

1) the whole-unit driving means and the relative drive means are actuated to keep the focused state at any focal length set by the zoom operation means.

2) only the whole-unit driving means is actuated to keep the focused state for the close object distance when the focal length set by the zoom operation means is identical to or approximately identical to the wide angle extremity, and when the focal length set by the zoom operation means is a focal length other than the wide angle extremity or approximate wide angle extremity, the whole-unit driving means and the relative drive means are actuated to keep the focused state.

3) only the relative drive means is actuated to keep the focused state for the close object distance when the focal length set by the zoom operation means is identical to or approximately identical to the telephoto extremity, and when the focal length set by the zoom operation means is a focal length other than the telephoto extremity or approximate telephoto extremity, the whole-unit driving means and the relative drive means are actuated to keep the focused state.

4) only the whole-unit driving means is actuated to keep the focused state for the close object distance when the focal length set by the zoom operation means is identical to or approximately identical to the wide angle extremity; only the relative drive means is actuated to keep the focused state for the close object distance when the focal length set by the zoom operation means is identical to or approximately identical to the telephoto extremity; when the focal length set by the zoom operation means is identical to an intermediate focal length other than the wide angle extremity, the approximate wide angle extremity, the telephoto extremity, or the approximate telephoto extremity, the whole-unit driving means and the relative drive means are actuated to keep the focused state.

5) only the whole-unit driving means is actuated to keep the focused state for the close object distance when the focal length set by the zoom operation means is identical to or approximately identical to the wide angle extremity, and only the relative drive means is actuated to keep the focused state when the focal length set by the zoom operation means is identical to an intermediate focal length other than the wide angle extremity or the approximate wide angle extremity.

In the five modes, when the whole-unit driving means and the relative drive means are actuated, preferably, no movement of the rear lens group relative to the image surface of the lens system takes place to facilitate the control.

According to another aspect of the present invention, there is provided a macro-photographing system in a zoom lens camera, comprising;

a positive front lens group on the object side and a negative rear lens group on the image surface side;

a whole-unit driving means for moving the front lens group and the rear lens group together;

a rear lens driving means for moving the rear lens group relative to the front lens group to vary the distance between the front and rear lens groups;

a zoom operation means for setting the focal length by the front and rear lens groups; and, a macro-photographing setting means for setting at least one close object distance;

wherein the camera position is fixed when the camera is focused on the object at the close object distance set by the macro-photographing setting means, and when the zoom operation means is actuated, at least one of the whole-unit driving means and the rear lens driving means is actuated to keep the focused state for the close object distance.

In this macro-photographing system, when the zoom operation means is actuated, the above-mentioned five control modes can be provided to keep the focused state for the close object.

The present disclosure relates to subject matter contained in Japanese Patent Application No. 8-79244 (filed on Apr. 1, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

The illustrated embodiments which will be discussed below are applied to a compact zoom lens camera disclosed in Japanese Patent Application No. 7-172216 or No. 8-43158, filed in the name of the assignee of the present application.

The term "zoom" refers to a variation in focal length without moving the focal point. In a conventional zoom lens for a single lens camera or compact camera, when the zooming means is actuated to vary the focal length, a plurality of lens groups are moved in accordance with a predetermined positional relationship therebetween. The focusing lens groups are normally located in an infinite photographing position corresponding to the infinite object distance. When the focusing means is actuated, the focusing lens groups are moved to a focal position before the shutter is opened.

However, in a compact zoom lens camera in which an image of a zoom finder system other than a zoom photographing system is viewed, when the zooming means is actuated to set the focal length, it is not always necessary to move the zoom photographing lens to a focal position on the object at a specific object distance (normally, the infinite object distance), so long as the finder optical system indicates a photographing range. Namely, the philosophy of zooming in a compact camera merely resides in the determination of the focal length while varying the finder magnification using the zooming means. In other words, the spacial distance between the front and rear lens groups or the position of the focusing lens groups should be correctly determined in accordance with the set focal length and the object distance before the shutter is opened when the focusing means is actuated thereafter.

Figure 1:
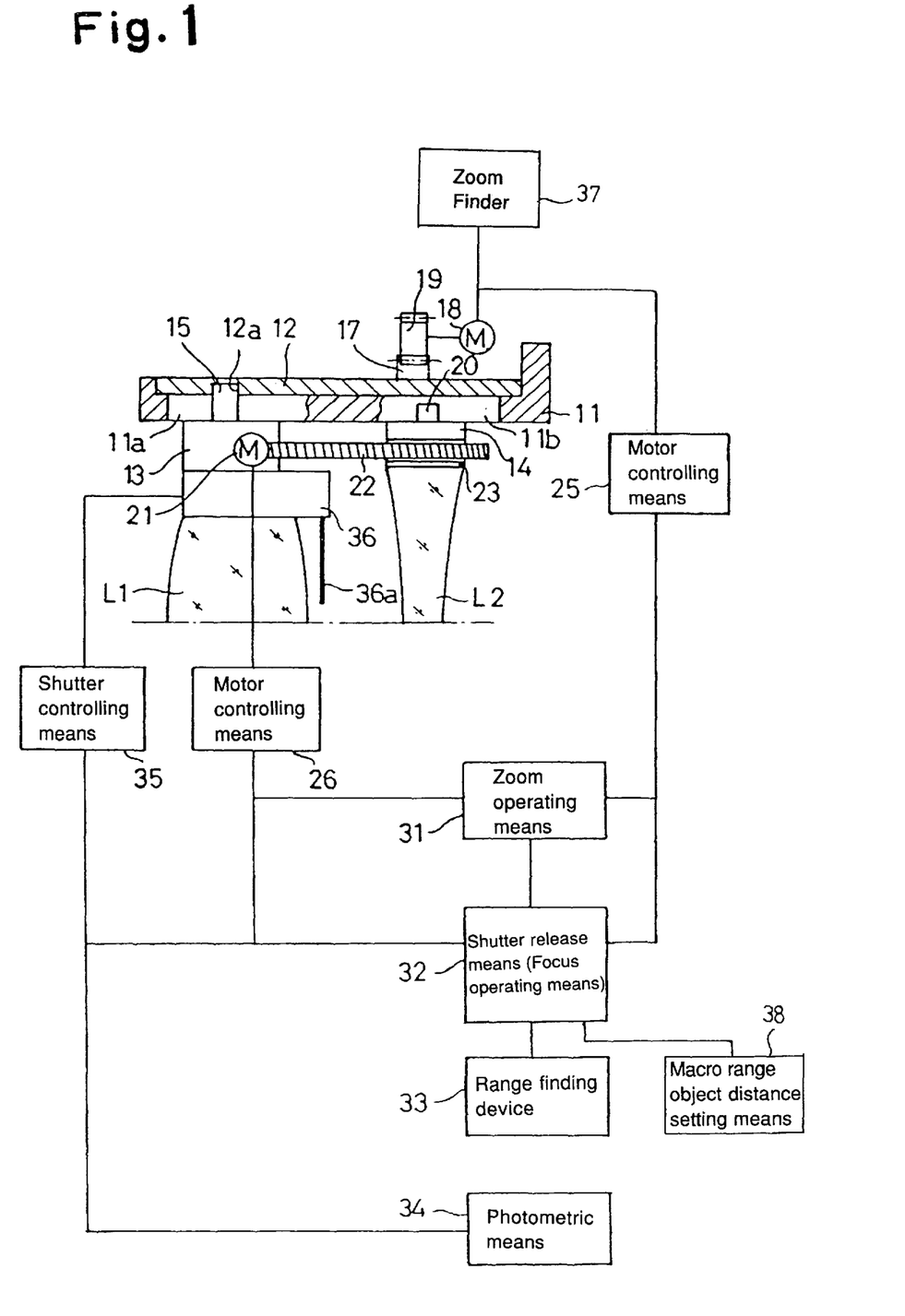
FIG. 1 is a schematic view of an internal structure of a zoom lens camera to which a macro-photographing system of the present invention is applied, by way of example.
Figure 9:
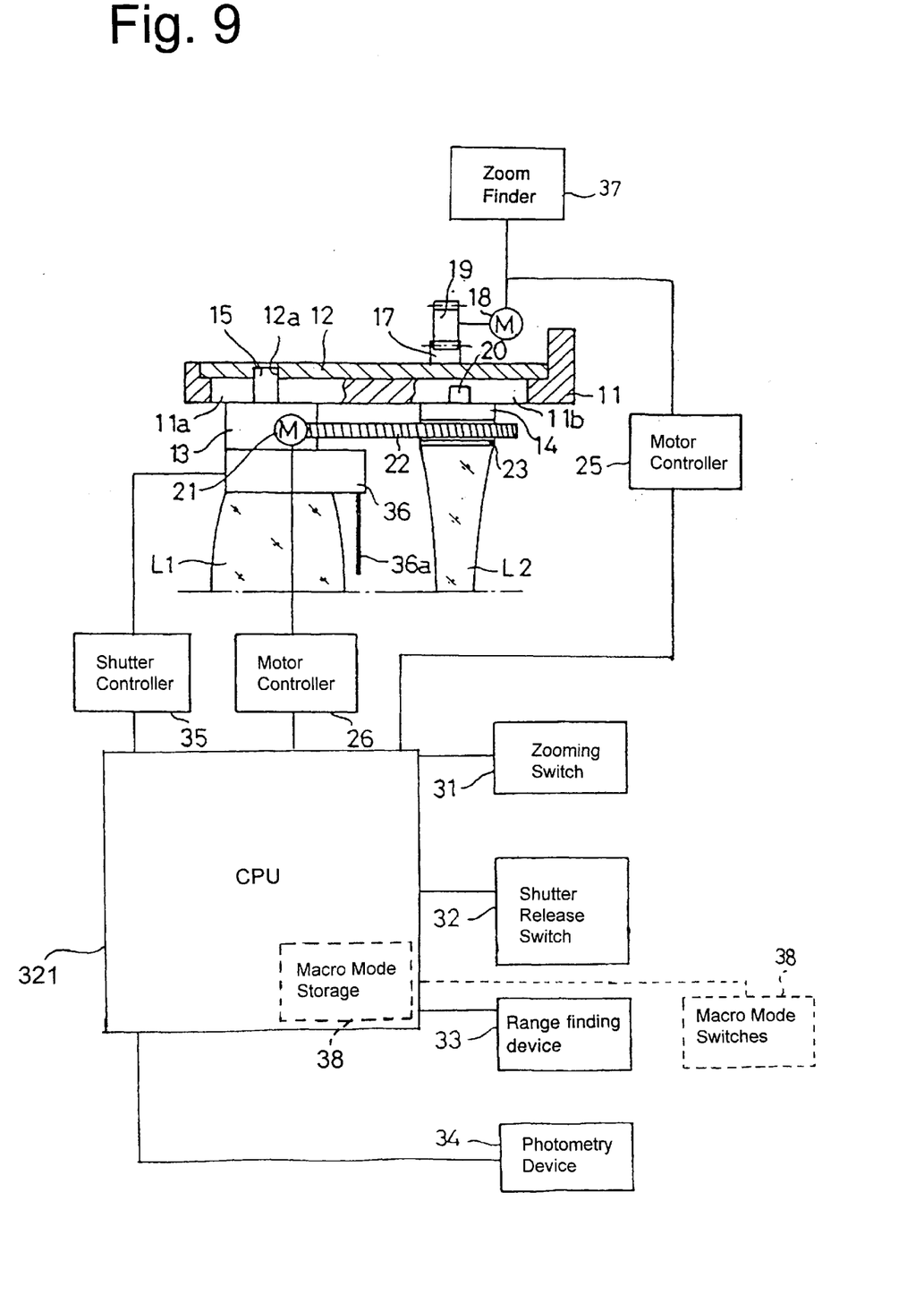
FIG. 9 shows an example of a specific implementation of the structure of FIG. 1.

The synopsis of the zoom lens camera according to the basic concept as discussed above will be described below. As can be seen in FIGS. 1 and 9, a zoom lens includes a positive front lens group L1 and a negative rear lens group L2. A drive ring 12 is rotatably supported on the outer peripheral surface of a stationary ring 11 of a lens barrel. A front lens support ring 13 which holds the front lens group L1 and a rear lens support ring 14 which holds the rear lens group L2 are fitted in the inner peripheral surface of the stationary ring 11. The stationary ring 11 is provided with a linear guide groove 11a which extends in parallel with the optical axis. A radial pin 15 provided on the front lens support ring 13 extends through the linear guide groove 11a and is fitted in a lead groove 12a formed on the inner peripheral surface of the drive ring 12. The drive ring 12 is provided with a gear 17 which is secured to the outer peripheral surface of drive ring 12, where the gear 17 is in mesh with a gear 19 of a main motor 18.

The stationary ring 11 is provided with another linear guide groove 11b for the rear lens group L2, in which a radial pin 20 secured to the rear lens support ring 14 is fitted. The front lens support ring 13 is provided with a rear lens moving motor 21 and a drive shaft 22 which is driven by the motor 21. The drive shaft 22 is engaged by a nut member 23 which is arranged not to be rotated and provided on the rear lens support ring 14.

In the arrangement mentioned above, when the drive ring 12 is rotated by the main motor 18, the front lens support ring 13 (front lens group L1) is moved in the optical axis direction in accordance with the relationship between the lead groove 12a and the linear guide groove 11a. The rear lens support ring 14 (rear lens group L2), which is associated with the front lens support ring 13 through the drive shaft 22 of the motor 21 and the nut member 23, is moved together with the front lens support ring 13. In other words, the main motor 18 is a motor which drives the "whole-unit", including all lens groups, at the same time. When the drive shaft 22 is rotated by the rear lens driving motor 21, the rear lens support ring 14 (rear lens group L2) is moved relative to the front lens support ring 13 (front lens group L1). In other words, the rear lens driving motor 21 is a motor which varies the distance between the front lens group L1 and the rear lens group L2. The main motor 18 and the rear lens driving motor 21 are controlled by motor controllers 25 and 26, respectively.

The camera body includes a zoom operating means (zooming device) 31, a focus operating means (focusing device) 32, an object distance measuring means device 33, a photometric means (device) 34, a shutter controlling means (device) 35, and a zoom finder device 37. The zooming device 31 includes, for example, a momentary switch which supplies a zooming command to the zoom lens consisting of the front lens group L1 and the rear lens group L2, i.e., a movement command to move the zoom lens from the wide angle extremity to the telephoto extremity and vice versa (i.e., from the telephoto extremity to the wide angle extremity).

The focusing device 32, in general, includes a release button which sends the object distance measuring command and the photometric command to the object distance measuring device 33 and the photometric device 34, respectively, when the switch (button) is depressed by a half step. When the release switch is depressed by a full step, the focusing operation is commenced, and the shutter 36 provided on the front lens support ring 13 is actuated through the shutter controlling device 35 after the focusing operation is complete. Alternatively, it is possible to commence the focusing operation when the release switch is depressed by a half step.

The shutter 36 opens the shutter blades 36a for a predetermined time period upon receipt of the output of the photometric device 34. The zoom finder device 37 is driven through the motor controller 25 and the main motor 18 when the zoom operating device 31 is actuated, to thereby vary the field of view of the finder (magnification) in accordance with the set focal length.

In the zoom lens camera constructed as above, the front lens group L1 and the rear lens group L2 are moved together when the zooming device 31 is actuated to drive the main motor 18 through at least the motor controller 25. It is possible to drive the rear lens drive motor 21 through the motor controller 26 at the same time as the main motor 18. It should be noted here that in the present invention, the movement of the front lens group L1 and the rear lens group L2 is not carried out in accordance with the conventional concept of zooming in which no focal position changes. Namely, when the zooming means 31 is actuated, the following operation modes are obtained;

1st mode: only the main motor 18 is driven to move the front lens group L1 and the rear lens group L2 without varying the spacial distance therebetween;

2nd mode: both the main motor 18 and the rear lens drive motor 21 are driven to move the front lens group L1 and the rear lens group L2 while varying the spacial distance therebetween.

In the first mode, it is impossible to always focus on a specific object. Nevertheless, this does not matter in a compact camera in which no image of the photographing system is observed, i.e., the finder image and photographing image may be independent of one other, and it is necessary to obtain a focused state only when the shutter is released. In the second mode, the front lens group L1 and the rear lens group L2 are moved while the movement of the focal position is permitted, and when the shutter is released, both the main motor 18 and the rear lens drive motor 21 are driven to obtain a focused state. The photographing range is observed through the zoom finder device 37.

In the zoom lens mentioned above, when the focusing device 32 is actuated in at least a part of the focal length zone set by the zooming means 31, both the main motor 18 and the rear lens drive motor 21 are driven to focus on the object. The displacements of the front lens group L1 and the rear lens group L2 caused by the main motor 18 and the rear lens drive motor 21 are determined by taking into account not only the movement thereof determined in accordance with the object distance supplied from the distance measuring device 33, but also the movement determined in accordance with the focal length data set by the zooming device 31. In this arrangement, in which when the focusing device 32 is actuated, both the main motor 18 and the rear lens drive motor 21 are driven, the freedom of control of the lens position is increased, thus resulting in easy control of the lens position.

In theory, it is possible to merely vary the finder magnification and the focal length data without driving the main motor 18 or the rear lens drive motor 21, and to simultaneously drive both the main motor 18 and the rear lens drive motor 21 to move the front lens group L1 and the rear lens group L2 to a position which is specifically determined in accordance with the focal length data and the object distance data obtained by the distance measuring means 33 (when the focusing means 32 is actuated).

The macro-photographing system of a zoom lens according to the present embodiment can be advantageously applied to a zoom lens having a device for moving the whole unit of the front lens group, and a device the rear lens group and a means for relatively moving the front lens group or the rear lens group with respect to the other. The zoom lens shown in FIG. 1 further includes a macro range object distance setting device 38 to realize the macro-photographing system of a zoom lens according to the present embodiment. The macro range object distance setting device 38 sets at least one close object distance (macro object distance). The macro object distance is for an object which is located at a close object distance in which no AF (Automatic Focusing) function is available. When the macro range object distance setting means 38 sets a close object distance, the AF function does not work, and instead of object distance information, macro-photographing information (close object distance information) is transmitted to the focus operating device 32. One or a plurality of close object distances can be set, for example, by one or more macro mode switches. Alternatively, it is possible to use a macro object distance selection device which is actuated to select the stored macro object distances.

In the macro-photographing system, the camera is moved and fixed to a position in which the camera is focused on the object at the close object distance set by the macro range object distance setting device 38. In this state, when the zooming device 31 is actuated, the zooming is carried out while keeping a focused (in-focus) state. In FIG. 8, it is assumed that the AF object distance range (from the shortest focal length at a normal mode, e.g., 0.7 m to ∞) in which the automatic focusing can be effected is "AF". In the present embodiment, zooming is effected while maintaining the focused state, at the specific close object distance m1, m2 or m3, at which no automatic focusing function is available and which is closer than the object distance represented by AF, (as indicated by M1, M2, or M3). Macro-zooming can be executed by driving at least one of (i) the entirety driving device, which drives the main motor 18 and (ii) the rear lens driving device which drives the rear lens drive motor 21. For example, when zooming is effected from the wide-angle extremity to the telephoto extremity at u=0.3 m, the image surface coincides and the magnification changes at all focal lengths. Namely, the image positions of the object at all focal lengths does not change while changing the magnification FIG. 9 shows an example of a more specific implementation of the structure of FIG. 1. Elements having or sharing the same function as those previously described are shown with the same reference numerals. As shown in FIG. 9, the functions of the shutter release means (device) and focusing operating means (device) may be divided between a CPU 321 and a shutter release switch 32. The functions of the zoom operating means (device) may be divided between the CPU 321 and a zooming switch 31. The functions of the photometric means (device) may be divided between the CPU 321 and a photometry device 34. The CPU 321 may be connected to and control the motor controllers 25 and 26 and shutter controller 35, and may receive inputs from zooming switch(es) 31, the range finding device 33 (e.g., AF module), and the photometry device 34 (e.g., a circuit including a photocell). The previously described functions of the macro range object distance setting means (device) may be carried out by, for example, one or both of macro mode switches and macro mode storage (memories) 38 in the CPU 321. The macro mode storage memories and/or switches 38 may be used to set the movement data, and may be read by the CPU 321 to control the motors 21 and 18, via controllers 25 and 26, to move the lens groups L1 and L2 between the positions shown in FIGS. 3 through 7.

Several examples of the front lens group L1 and the rear lens group L2 and the control of the movement thereof at the macro-photographing mode will be discussed below.

Figure 2:
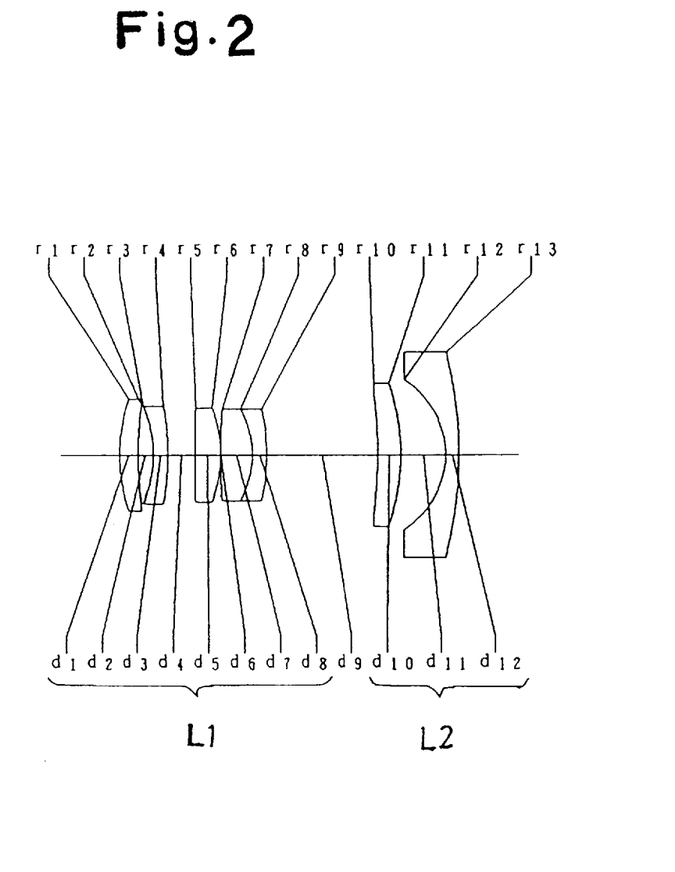
FIG. 2 is a schematic view of a lens arrangement of a zoom lens system to which a macro-photographing system of the present invention is applied.

Table 1 shows lens data of the front lens group L1 and the rear lens group L2, and FIG. 2 shows a lens arrangement thereof. The front lens group L1 includes five lens elements, two of which are cemented, and the rear lens group L2 includes two lens elements.

In the table and the drawings, "$F_{NO}$" designates the F-number, "f" the focal length, "ω" the half angle of view, "fB" the back focal distance, "ri" the radius of curvature of each lens surface, "di" the lens thickness or the distance between lenses, "n" the refractive index of the d-line, and "ν" the Abbe number, respectively.

TABLE 1

$F_{NO}$ = 1:3.9–10
f = 39–102
ω = 28.4°–12.0°
fB = 9.47–63.1

| Surface No. | ri | di | n | ν |
|---|---|---|---|---|
| 1 | 20.550 | 2.10 | 1.48749 | 70.2 |
| 2 | 42.627 | 1.65 | — | — |
| 3 | −15.428 | 1.66 | 1.83400 | 37.2 |
| 4 | −30.458 | 3.06 | — | — |
| 5 | 631.122 | 2.80 | 1.51633 | 64.1 |
| 6 | −16.980 | 0.10 | — | — |
| 7 | 91.952 | 3.42 | 1.53996 | 59.5 |
| 8 | −11.244 | 1.60 | 1.80400 | 46.6 |
| 9 | −23.784 | 12.56–2.59 | — | — |
| 10* | −42.469 | 2.50 | 1.58547 | 29.9 |
| 11 | −26.490 | 5.04 | — | — |
| 12 | −10.416 | 1.50 | 1.71299 | 53.9 |
| 13 | −48.829 | — | — | — |

*designates an aspherical surface with symmetrical rotation.

Aspherical data;
K=0.0, A4=5.96223×10$^{-5}$, A6=2.52645×10$^{-7}$, A8=2.89629×10$^{-9}$ The shape of the aspherical surface with symmetrical rotation can be generally expressed as follows.

$$x = Ch^2/\{1+[1-(1+K)C^2h^2]^{1/2}\} + A4h^4 + A6h^6 + A8h^8 + \ldots$$

Wherein, "c" represents a curvature of the aspherical vertex (1/r);

"h" represents a height above the axis;

"k" represents a conic constant.

"A4" represents a fourth-order aspherical factor,

"A6" represents a sixth-order aspherical factor,

"A8" represents a eighth-order aspherical factor.

The zooming data is shown in Table 2. "TL" represents the distance between the first surface and the image surface, "d1G–2G" the distance between the front lens group L1 and the rear lens group L2, "XA(f)" the displacement of the entire lens group by the zooming means 31 at the infinite object distance, "XB(f)" the displacement of the rear lens group L2 relative to the front lens group L1.

TABLE 2

| f | TL | d1G–2G | XA (f) | XB (f) |
|---|---|---|---|---|
| 39 | 47.45 | 12.56 | 0 | 9.97 |
| 45 | 50.36 | 10.44 | 2.91 | 7.85 |
| 70 | 66.66 | 5.42 | 19.21 | 2.83 |
| 95 | 85.56 | 3.05 | 38.11 | 0.46 |
| 102 | 91.11 | 2.59 | 43.66 | 0 |

Note that in Table 2, "XA" is 0 (zero) for the infinite object at the short focal length extremity and "XB" is 0 (zero) for the infinite object at the long focal length extremity. These (XA=0, XB=0) are reference positions. It is preferable that a slight tolerance is set in the opposite direction (minus direction) to precisely determine "XA" and "XB".

Embodiments 1 through 5 (as shown in FIGS. 3 through 7) below are examples of preferred control schemes of the positions of the front and rear lens groups L1 and L2. The particulars of the lens groups L1 and L2 are shown in Tables 1 and 2 mentioned above when the close (macro) object distance u is 0.3 m (u=0.3 m) and 0.5 m (u=0.5 m), respectively. In Tables 3 through 7 and FIGS. 3 through 7, "XA" represents the displacement of the lens groups by the whole-unit driving device, "XB" the relative movement of the front and rear lens groups by the relative drive device (rear lens driving device), "(f, u)" the function of the focal length and the object distance, "(u)" the function of the object distance, and "ΔXA" and "ΔXB" the movement of the front and rear lens groups by the whole-unit driving means and the movement of the rear lens group relative to the rear lens group by the rear lens driving means, when the zooming means 31 is actuated at the macro object distance, respectively. Moreover, "XAmax", "XA (f)max", "XBmax", and "XB(f)max" represent the maximum movement of the lens groups by the whole-unit driving means at the normal photographing mode for the zooming and focusing operations; the maximum movement of the lens groups for the zooming operation; the maximum relative movement of the lens groups by the rear lens driving means for the zooming and focusing operations; and the maximum movement of the lens groups for the zooming operation, respectively. Note that the length of the arrows of "ΔXA" and "ΔXB" in FIGS. 3 through 6 are emphasized in comparison with the length of the arrows of "XA" and "XB". "fB" designates the back focal distance and "m" the magnification.

Figure 3:
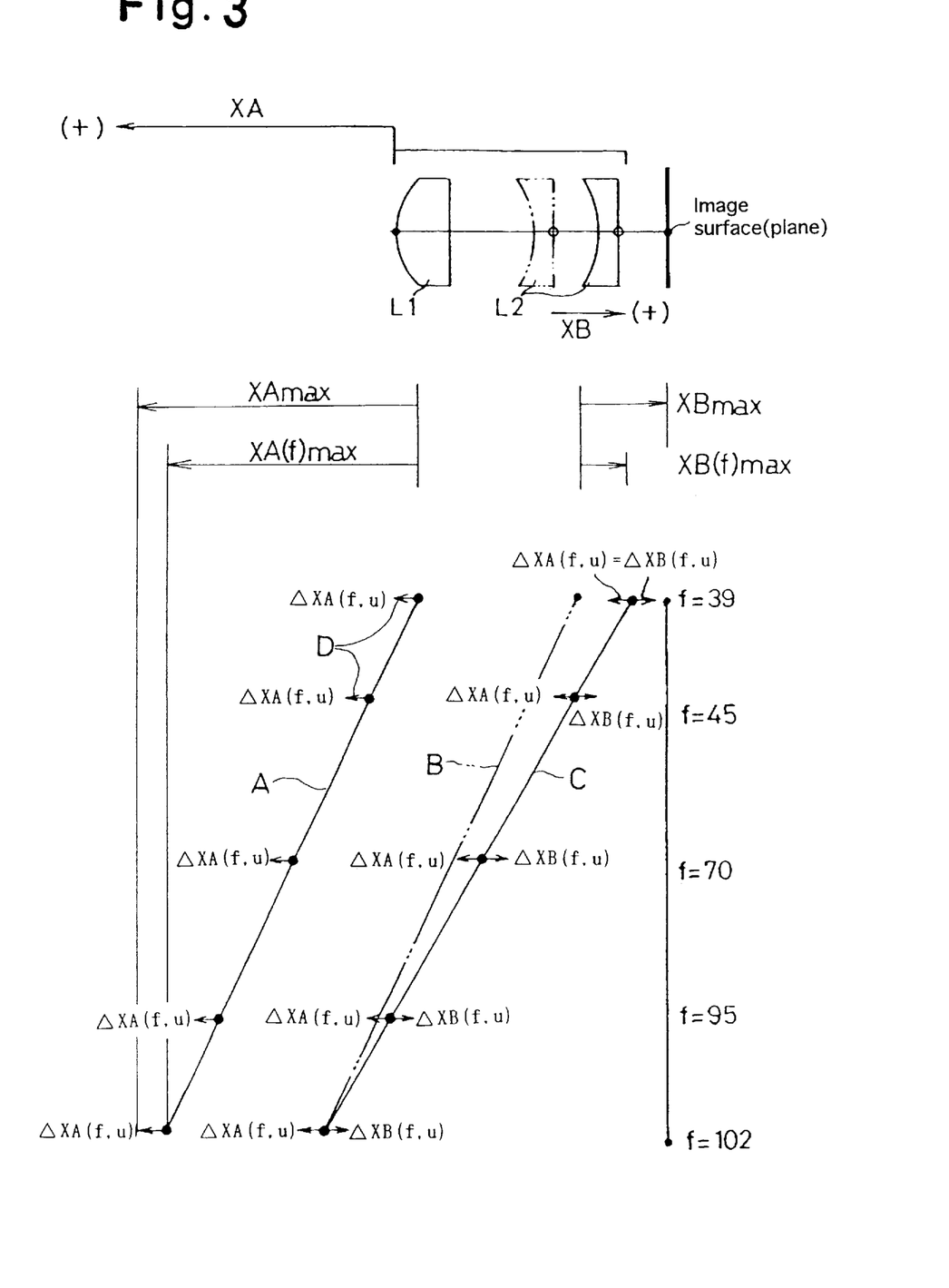
FIGS. 3 through 7 are diagrams of examples of the control of the movement of lenses in a macro-photographing system according to the present invention.

More specifically, in FIG. 3, a line "A" shows position of the front lens group L1 for an in-focus state for an infinite object at a set focal length. A line "B" shows position of the rear lens group L2 when the rear lens group L2 is moved together with the front lens group L1 by the main motor 18. A line C shows position of the rear lens group L2 for an in-focus state for an infinite object, at a set focal length. A distance <u>BC</u> between lines "B" and "C" designates a moving amount of the rear lens group L2 relative to the front lens group L1 by the motor 21. Arrows "D" (although only two arrows are identified, "D" designates each arrow extending from the points on lines "A", "B", and "C") designate moving amounts of the first lens group L1 for macro photographing from an in-focus state for an infinite object. When the macro-photographing is executed the first lens group L1 moves to the point of the arrows D. At a focal length 102 mm, for example, when macro photographing is executed from a normal photographing position for an of in-focus state for an infinite object, the rear lens group L2 does not move, because the moving amount ΔXA(f,u) by the main motor 18 and the moving amount ΔXB(f,u) by the motor 21 of the rear lens group are identical.

<Embodiment 1>

FIG. 3 and Table 3 correspond to a first embodiment of the present invention.

TABLE 3

| f | d1G–2G | fB | ΔXA | ΔXB | m |
|---|---|---|---|---|---|
| u = 0.5 m | | | | | |
| 39 | 14.26 | 9.47 | 1.70 | 1.70 | −0.09 |
| 45 | 12.15 | 14.50 | 1.72 | 1.72 | −0.10 |
| 70 | 7.21 | 35.81 | 1.78 | 1.78 | −0.17 |
| 95 | 4.92 | 57.12 | 1.87 | 1.87 | −0.24 |
| 102 | 4.49 | 63.08 | 1.89 | 1.89 | −0.26 |
| u = 0.3 m | | | | | |
| 39 | 15.73 | 9.47 | 3.17 | 3.17 | −0.17 |
| 45 | 13.65 | 14.50 | 3.21 | 3.21 | −0.20 |
| 70 | 8.89 | 35.81 | 3.47 | 3.47 | −0.33 |
| 95 | 6.85 | 57.12 | 3.85 | 3.85 | −0.49 |
| 102 | 6.51 | 63.08 | 3.92 | 3.92 | −0.54 |

In the first embodiment, the whole-unit driving device and the rear lens driving device move their respective lens group(s) by the same displacement in opposite directions at any focal length set by the zooming device 31 (ΔXA=ΔXB). The front lens group is advanced, but no movement of the rear lens group relative to the image surface takes place.

<Embodiment 2>

Figure 4:
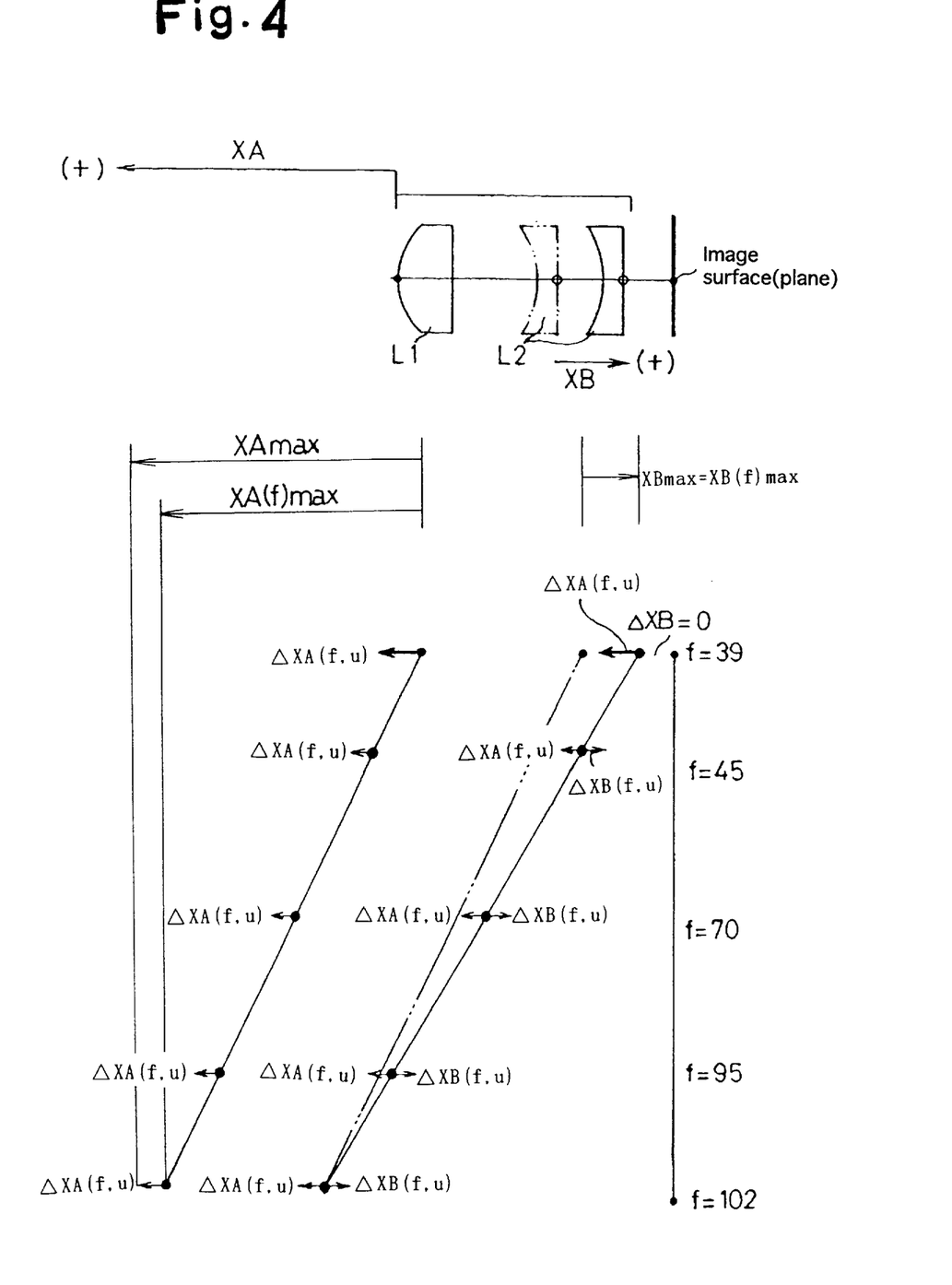

FIG. 4 and Table 4 correspond to a second embodiment of the present invention.

TABLE 4

| f | d1G–2G | fB | ΔXA | ΔXB | m |
|---|---|---|---|---|---|
| u = 0.5 m | | | | | |
| 39 | 12.56 | 13.42 | 3.95 | 0 | −0.10 |
| 45 | 12.15 | 14.50 | 1.72 | 1.72 | −0.10 |
| 70 | 7.21 | 35.81 | 1.78 | 1.78 | −0.17 |
| 95 | 4.92 | 57.12 | 1.87 | 1.87 | −0.24 |
| 102 | 4.49 | 63.08 | 1.89 | 1.89 | −0.26 |
| u = 0.3 m | | | | | |
| 39 | 12.56 | 17.84 | 8.37 | 0 | −0.21 |
| 45 | 13.65 | 14.50 | 3.21 | 3.21 | −0.20 |
| 70 | 8.89 | 35.81 | 3.47 | 3.47 | −0.33 |
| 95 | 6.85 | 57.12 | 3.85 | 3.85 | −0.49 |
| 102 | 6.51 | 63.08 | 3.92 | 3.92 | −0.54 |

In the second embodiment, only the whole-unit driving device moves both lens groups L1 and L2 to focus on the object at the wide-angle extremity set by the zooming device 31 (ΔXB=0), and the whole-unit driving device and the rear lens driving device move their respective lens group(s) by the same displacement in opposite directions at the remaining focal lengths (ΔXA=ΔXB).

<Embodiment 3>

Figure 5:
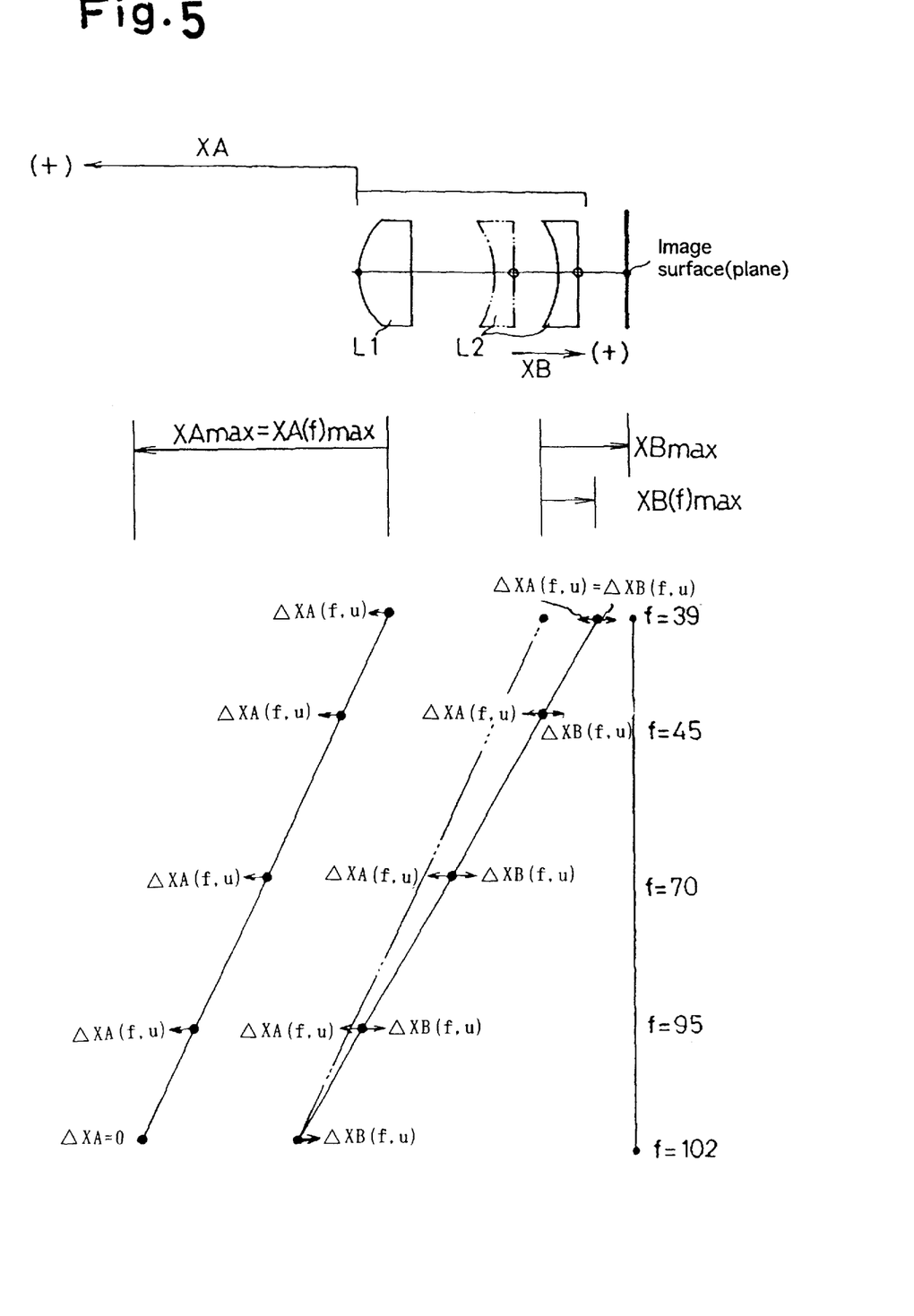

FIG. 5 and Table 5 correspond to a third embodiment of the present invention.

TABLE 5

| f | d1G–2G | fB | ΔXA | ΔXB | m |
|---|---|---|---|---|---|
| u = 0.5 m | | | | | |
| 39 | 14.26 | 9.47 | 1.70 | 1.70 | −0.09 |
| 45 | 12.15 | 14.50 | 1.72 | 1.72 | −0.10 |
| 70 | 7.21 | 35.81 | 1.78 | 1.78 | −0.17 |
| 95 | 4.92 | 57.12 | 1.87 | 1.87 | −0.24 |
| 102 | 4.63 | 61.05 | 0 | 2.03 | −0.25 |

TABLE 5-continued

| f | d1G–2G | fB | ΔXA | ΔXB | m |
|---|---|---|---|---|---|
| u = 0.3 m | | | | | |
| 39 | 15.73 | 9.47 | 3.17 | 3.17 | −0.17 |
| 45 | 13.65 | 14.50 | 3.21 | 3.21 | −0.20 |
| 70 | 8.89 | 35.81 | 3.47 | 3.47 | −0.33 |
| 95 | 6.85 | 57.12 | 3.85 | 3.85 | −0.49 |
| 102 | 6.74 | 58.94 | 0 | 4.14 | −0.50 |

In the third embodiment, only the whole-unit driving device moves both lens groups L1 and L2 to focus on the object at the telephoto extremity set by the zooming device 31 (ΔXA=0), and the entirety driving means and the rear lens driving device move their respective lens group(s) by the same displacement in opposite directions at the remaining focal lengths (ΔXA=ΔXB).

<Embodiment 4>

Figure 6:
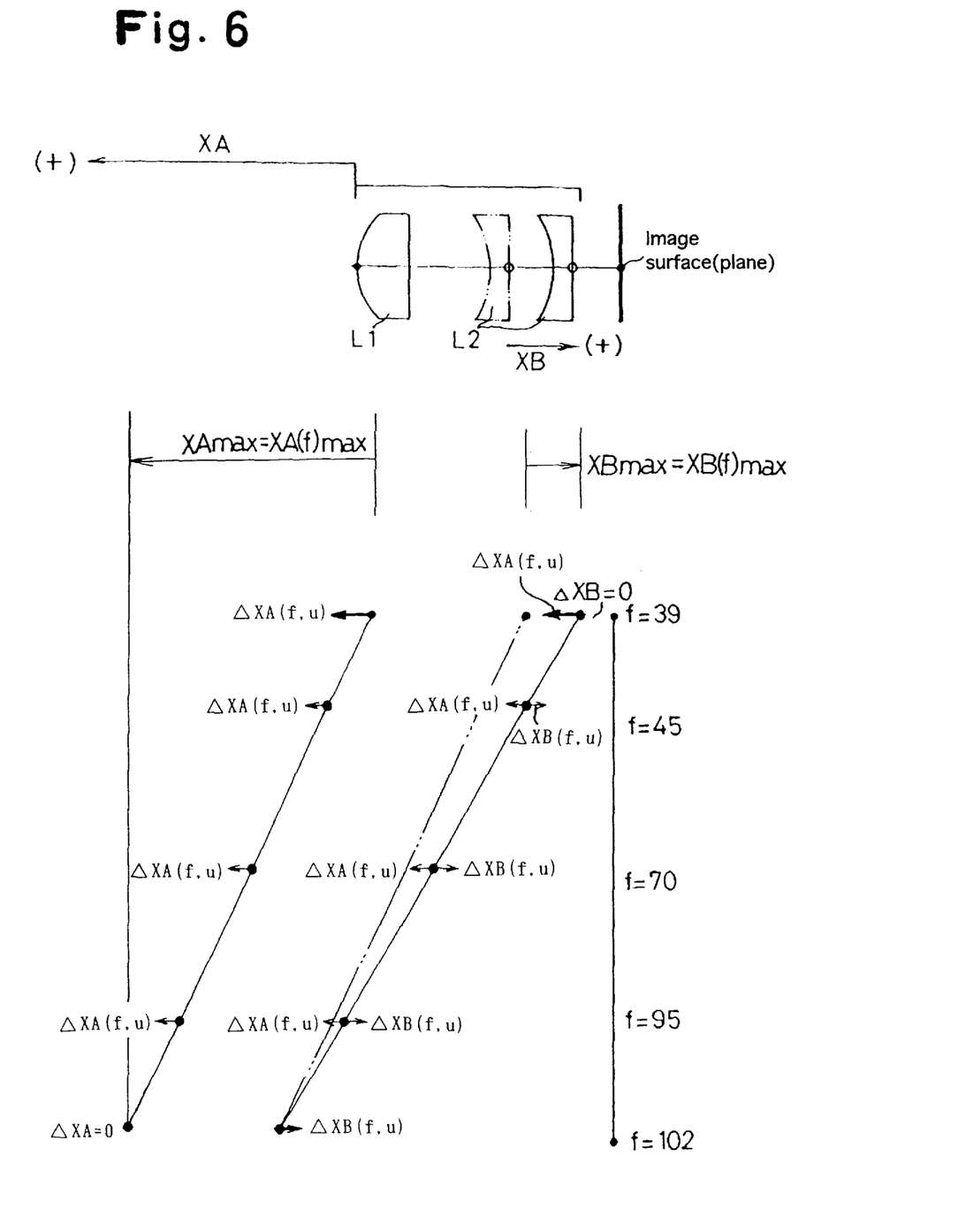

FIG. 6 and Table 6 correspond to a fourth embodiment of the present invention.

TABLE 6

| f | d1G–2G | fB | ΔXA | ΔXB | m |
|---|---|---|---|---|---|
| u = 0.5 m | | | | | |
| 39 | 12.56 | 13.42 | 3.95 | 0 | −0.10 |
| 45 | 12.15 | 14.50 | 1.72 | 1.72 | −0.10 |
| 70 | 7.21 | 35.81 | 1.78 | 1.78 | −0.17 |
| 95 | 4.92 | 57.12 | 1.87 | 1.87 | −0.24 |
| 102 | 4.63 | 61.05 | 0 | 2.03 | −0.25 |
| u = 0.3 m | | | | | |
| 39 | 12.56 | 17.56 | 8.37 | 0 | −0.21 |
| 45 | 13.65 | 13.65 | 3.21 | 3.21 | −0.20 |
| 70 | 8.89 | 35.81 | 3.47 | 3.47 | −0.33 |
| 95 | 6.85 | 57.12 | 3.85 | 3.85 | −0.49 |
| 102 | 6.74 | 58.94 | 0 | 4.14 | −0.50 |

In the fourth embodiment, only the whole-unit driving device moves both lens groups L1 and L2 to focus on the object at the wide-angle extremity set by the zooming device 31 (ΔXB=0), and only the rear lens driving device moves the rear lens group L2 at the wide-angle extremity (ΔXA=0). The whole-unit driving device and the rear lens driving device move their respective lens group(s) by the same displacement in opposite directions at the remaining intermediate focal lengths (ΔXA=ΔXB).

<Embodiment 5>

Figure 7:
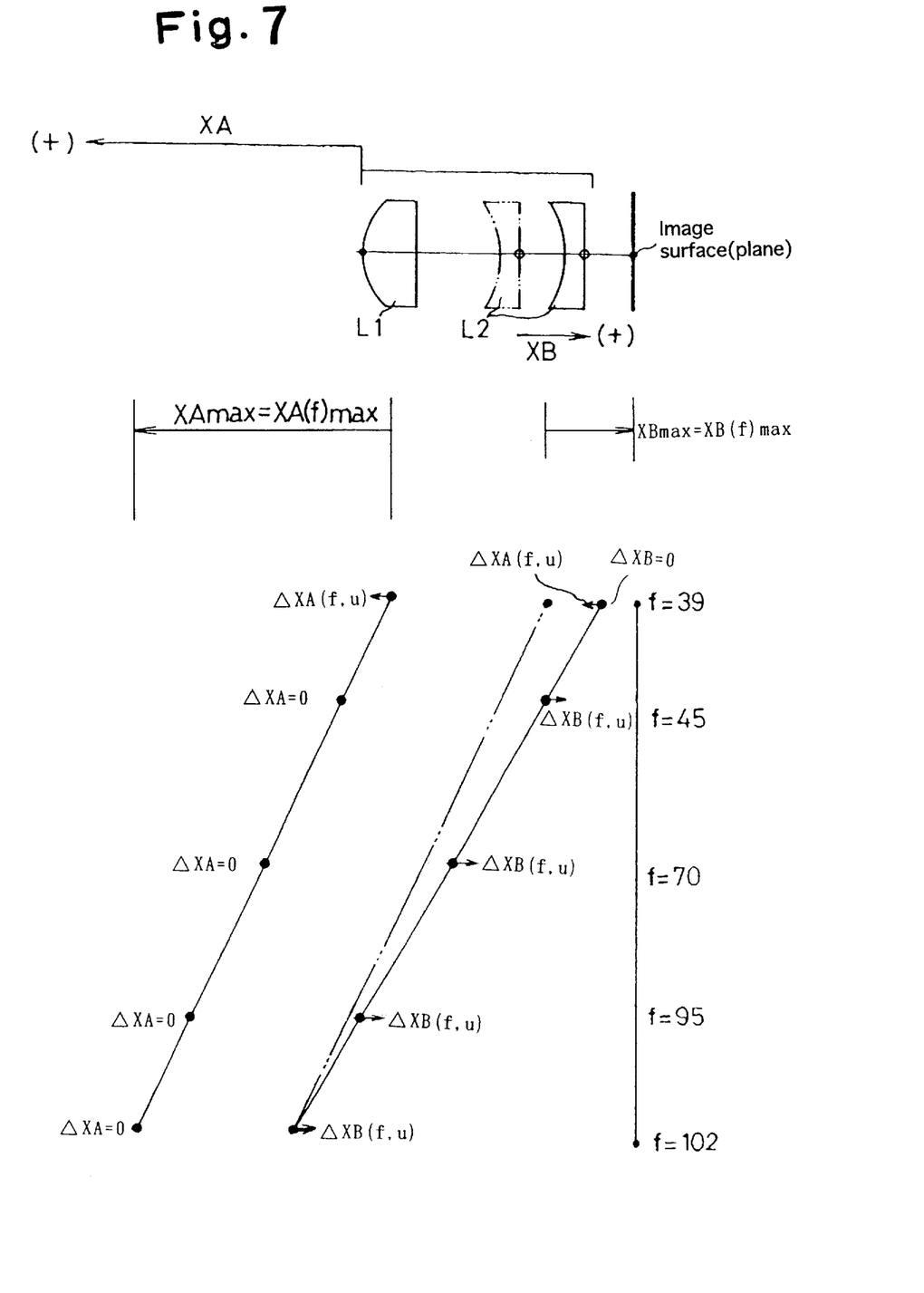
Figure 8:
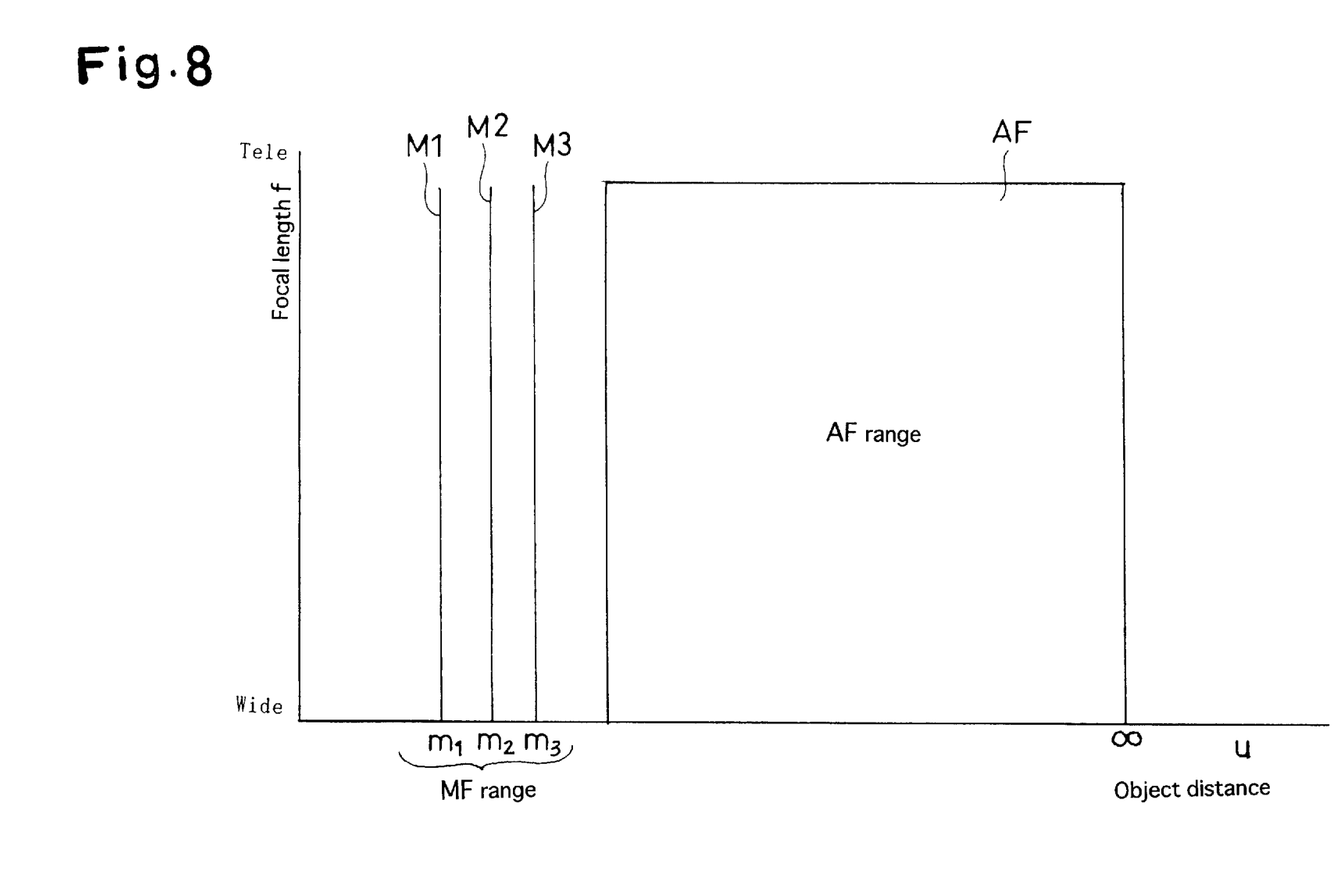
FIG. 8 is a conceptual view of a macro-photographing system according to the present invention.

FIG. 7 and Table 7 correspond to a fifth embodiment of the present invention.

TABLE 7

| f | d1G–2G | fB | ΔXA | ΔXB | m |
|---|---|---|---|---|---|
| u = 0.5 m | | | | | |
| 39 | 12.56 | 13.42 | 3.95 | 0 | −0.10 |
| 45 | 13.26 | 11.67 | 0 | 2.83 | −0.10 |
| 70 | 7.53 | 33.70 | 0 | 2.11 | −0.16 |
| 95 | 5.08 | 55.09 | 0 | 2.03 | −0.23 |
| 102 | 4.63 | 61.05 | 0 | 2.03 | −0.25 |
| u = 0.3 m | | | | | |
| 39 | 12.56 | 17.84 | 8.37 | 0 | −0.21 |
| 45 | 15.97 | 8.96 | 0 | 5.54 | −0.16 |
| 70 | 9.49 | 31.74 | 0 | 4.07 | −0.30 |
| 95 | 7.13 | 53.03 | 0 | 4.09 | −0.45 |
| 102 | 6.74 | 58.94 | 0 | 4.14 | −0.50 |

In the fifth embodiment, only the whole-unit driving device moves both lens groups L1 and L2 to focus on the object at the telephoto extremity set by the zooming device 31 ($\Delta XB=0$), and only the rear lens driving device moves the lens group L2 at the remaining focal lengths ($\Delta XA=0$).

The internal structure of the zoom lens shown in FIG. 1 is an example and the present invention is not limited thereto. The mechanical structure of the zoom lens is not the subject of the present invention.

As can be understood from the above discussion, in a macro-photographing system of a zoom lens camera according to the present invention, zooming (variation in magnification) can be effected at a selected close object distance.

What is claimed is:

1. A macro-photographing system in a zoom lens camera, comprising:

a lens system having at least a movable front lens group on an object side and a movable rear lens group on an image surface side;

a whole-unit driving means for moving the front lens group and the rear lens group together;

a relative drive means for relatively moving the front lens group or the rear lens group to vary a distance between the front and rear lens groups;

a zoom operation means for setting the focal length by the lens system; and a macro-photographing setting means for setting at least one close object distance;

wherein the camera position is fixed when the camera is focused on the object at said at least one close object distance set by the macro-photographing setting means, and when the zoom operation means is actuated, at least one of the whole-unit driving means and the relative drive means is actuated to maintain a focused state for the close object distance.

2. A macro-photographing system in a zoom lens according to claim 1, further comprising an auto focus device to automatically focus on an object to be photographed, and wherein, when said at least one close object distance is set by said macro-photographing setting means, at least one of said front and rear lens group is moved in accordance with said focal length set by said zoom operation means without an operation of said auto focus device.

3. A macro-photographing system in a zoom lens according to claim 1, wherein said macro-photographing setting means includes a plurality of settable close object distances.

4. A macro-photographing system in a zoom lens camera according to claim 1, wherein the whole-unit driving means and the relative drive means are actuated to keep the focused state at any focal length set by the zoom operation means.

5. A macro-photographing system in a zoom lens camera according to claim 1, wherein only the whole-unit driving means is actuated to keep the focused state for the close object distance when the focal length set by the zoom operation means is identical to or approximately identical to the wide angle extremity, and when the focal length set by the zoom operation means is a focal length other than the wide angle extremity or approximate wide angle extremity, the whole-unit driving means and the relative drive means are actuated to keep the focused state.

6. A macro-photographing system in a zoom lens camera according to claim 1, wherein only the relative drive means is actuated to keep the focused state for the close object distance when the focal length set by the zoom operation means is identical to or approximately identical to the telephoto extremity, and when the focal length set by the zoom operation means is a focal length other than the telephoto extremity or approximate telephoto extremity, the whole-unit driving means and the relative drive means are actuated to keep the focused state.

7. A macro-photographing system in a zoom lens camera according to claim 1, wherein only the whole-unit driving means is actuated to keep the focused state for the close object distance when the focal length set by the zoom operation means is identical to or approximately identical to the wide angle extremity, and wherein only the relative drive means is actuated to keep the focused state for the close object distance when the focal length set by the zoom operation means is identical to or approximately identical to the telephoto extremity, and when the focal length set by the zoom operation means is identical to an intermediate focal length other than the wide angle extremity, the approximate wide angle extremity, the telephoto extremity, or the approximate telephoto extremity, the whole-unit driving means and the relative drive means are actuated to keep the focused state.

8. A macro-photographing system in a zoom lens camera according to claim 1, wherein only the whole-unit driving means is actuated to keep the focused state for the close object distance when the focal length set by the zoom operation means is identical to or approximately identical to the wide angle extremity, and wherein only the relative drive means is actuated to keep the focused state when the focal length set by the zoom operation means is identical to an intermediate focal length other than the wide angle extremity or the approximate wide angle extremity.

9. A macro-photographing system in a zoom lens camera according to claim 1, wherein when the whole-unit driving means and the relative drive means are actuated, no movement of the rear lens group relative to an image surface of the lens system takes place.

10. A macro-photographing system in a zoom lens camera, comprising:

a positive front lens group on an object side and a negative rear lens group on an image surface side;

a whole-unit driving means for moving the front lens group and the rear lens group together;

a rear lens driving means for moving the rear lens group relative to the front lens group to vary a distance between the front and rear lens groups;

a zoom operation means for setting the focal length by the front and rear lens groups; and a macro-photographing setting means for setting at least one close object distance;

wherein the camera position is fixed when the camera is focused on the object at said at least one close object distance set by the macro-photographing setting means, and when the zoom operation means is actuated, at least one of the whole-unit driving means and the rear lens driving means are actuated to keep the focused state for the close object distance.

11. A macro-photographing system in a zoom lens according to claim 10, further comprising an auto focus device to automatically focus on an object to be photographed, and wherein, when said close object distance is set by said macro-photographing setting means, at least one of said front and rear lens group is moved in accordance with a focal length set by said zoom operation means without an operation of said auto focus device.

12. A macro-photographing system in a zoom lens according to claim 1, wherein said macro-photographing setting means includes a plurality of settable close object distance.

13. A macro-photographing system in a zoom lens camera according to claim 10, wherein the whole-unit driving means and the rear lens driving means are actuated to keep a focused state at any focal length set by the zoom operation means.

14. A macro-photographing system in a zoom lens camera according to claim 10, wherein only the whole-unit driving means is actuated to keep the focused state for the close object distance when the focal length set by the zoom operation means is identical to or approximately identical to the wide angle extremity, and when the focal length set by the zoom operation means is a focal length other than the wide angle extremity or approximate wide angle extremity, the whole-unit driving means and the rear lens driving means are actuated to keep the focused state.

15. A macro-photographing system in a zoom lens camera according to claim 10, wherein only the rear lens driving means is actuated to keep the focused state for the close object distance when the focal length set by the zoom operation means is identical to or approximately identical to the telephoto extremity, and when the focal length set by the zoom operation means is a focal length other than the telephoto extremity or approximate telephoto extremity, the whole-unit driving means and the rear lens driving means are actuated to keep the focused state.

16. A macro-photographing system in a zoom lens camera according to claim 10, wherein only the whole-means driving means is actuated to keep the focused state for the close object distance when the focal length set by the zoom operation means is identical to or approximately identical to the wide angle extremity, and wherein only the rear lens driving means is actuated to keep the focused state for the close object distance when the focal length set by the zoom operation means is identical to or approximately identical to the telephoto extremity, and when the focal length set by the zoom operation means is identical to an intermediate focal length other than the wide angle extremity, the approximate wide angle extremity, the telephoto extremity, or the approximate telephoto extremity, the whole-unit driving means and the rear lens driving means are actuated to keep the focused state.

17. A macro-photographing system in a zoom lens camera according to claim 10, wherein only the whole-unit driving means is actuated to keep the focused state for the close object distance when the focal length set by the zoom operation means is identical to or approximately identical to the wide angle extremity, and wherein only the rear lens driving means is actuated to keep the focused state when the focal length set by the zoom operation means is identical to an intermediate focal length other than the wide angle extremity or the approximate wide angle extremity.

18. A macro-photographing system in a zoom lens camera according to claim 10, wherein when the whole-unit driving means and the rear lens driving means are actuated, no movement of the rear lens group relative to an image surface of the lens system takes place.

* * * * *

UNITED STATES PATENT AND TRADEMARK OFFICE
CERTIFICATE OF CORRECTION

PATENT NO. : 5,850,577
DATED : December 15, 1998
INVENTOR(S) : Takayuki ITO

It is certified that error appears in the above-identified patent and that said Letters Patent is hereby corrected as shown below:

At column 11, line 49 (claim 4, line 3) of the printed patent, "the focused" should be —a focused—.

At column 12, line 58 (claim 11, line 4) of the printed patent, before "close" insert —at least one—.

At column 12, line 60 (claim 1, line 6) of the printed patent, delete "a".

At column 12, line 64 (claim 12, line 2) of the printed patent, "1" should be —10—.

Signed and Sealed this

Sixth Day of June, 2000

Q. TODD DICKINSON

*Attest:*

*Attesting Officer*       *Director of Patents and Trademarks*